United States Patent [19]

Vesper et al.

[11] 3,732,466

[45] May 8, 1973

[54] PROGRAMMER

[75] Inventors: Daniel M. Vesper; Vern A. Street, both of Bartlesville, Okla.

[73] Assignee: Phillips Petroleum Company, Bartlesville, Okla.

[22] Filed: Apr. 1, 1971

[21] Appl. No.: 130,250

[52] U.S. Cl. ....................................317/140, 73/23.1

[51] Int. Cl. ........................G01n 31/08, H01h 47/14

[58] Field of Search ........................317/137, 139, 140

[56] References Cited

UNITED STATES PATENTS 3,391,305 7/1968 Bradwin et al. ......................317/137

*Primary Examiner*—L. T. Hix
*Attorney*—Young and Quigg

[57] ABSTRACT

A programmer is disclosed which utilizes a diode matrix. Pulses at a predetermined frequency are applied to the input of a counter which has a plurality of outputs. These outputs are applied to first terminals of the matrix so that signals are established representing consecutive time intervals. The matrix is provided with a plurality of outputs which are applied through latching circuits to provide control signals. The input and output terminals of the matrix are selectively connected together by means of diodes so that output signals are established in any desired time sequence. This programmer can be employed to advantage to control a chromatographic analyzer.

7 Claims, 5 Drawing Figures

INVENTORS
D. M. VESPER
V. A. STREET
BY Young & Quigg
ATTORNEYS

INVENTORS
D. M. VESPER
V. A. STREET

BY Young & Quigg

ATTORNEYS

PROGRAMMER

In various types of analytical and control equipment there is a need for programmers to initiate operations in a predetermined sequence. One example occurs in the field of chromatography. In many chromatographic analyzers, sampling injection and selective attenuation of output signals from the detector are controlled automatically in timed sequence by a programmer. Conventional programmers which have been employed for this purpose include switches operated by rotating cams and photocells actuated by light transmitted through openings in a rotating disk. While these programmers are satisfactory in many applications, a need exists for a programmer which does not employ moving parts and which can readily be adjusted. The adjustment of cams and the openings in rotating plates can be time consuming, and such adjustments often do not give the desired precision.

In accordance with this invention, an improved programmer is provided which utilizes a diode matrix. Pulses at a predetermined frequency are applied to the input of a counter which has a plurality of outputs. These outputs are applied to first terminals of the matrix so that signals are established representing consecutive time intervals. The matrix is provided with a plurality of outputs which are applied through latching circuits to provide control signals. The input and output terminals of the matrix are selectively connected together by means of diodes so that output signals are established in any desired time sequence. This programmer can be employed to advantage to control a chromatographic analyzer.

In the accompanying drawing.

Figure 1:
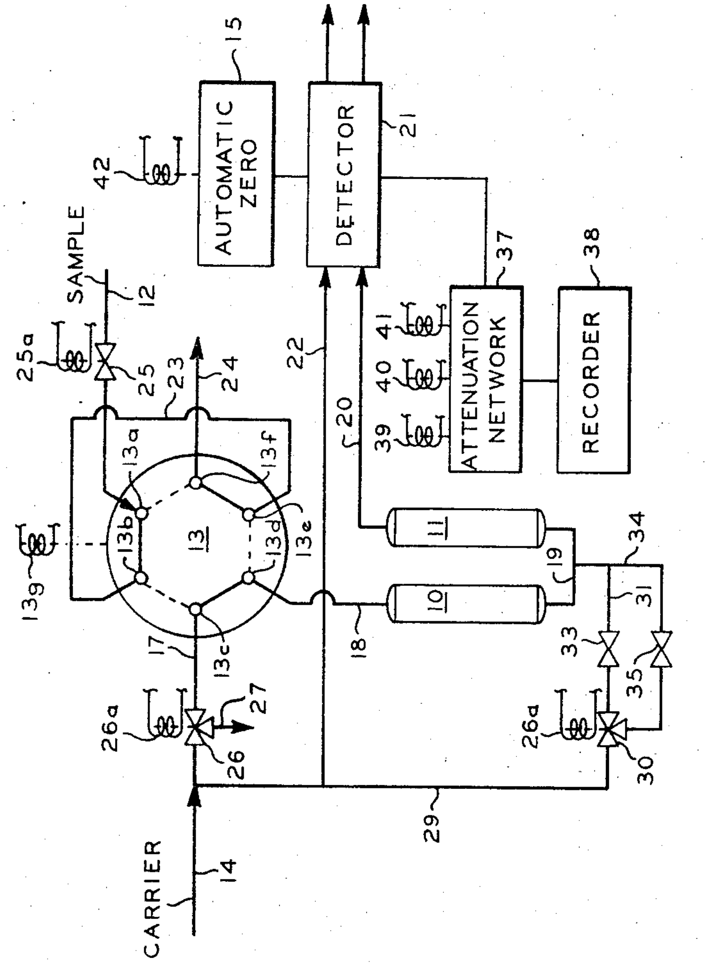
FIG. 1 is a schematic representation of a chromatographic analyzer which is controlled by the programmer of this invention.

Referring now to the drawing in detail and to FIG. 1 in particular, there is shown a chromatographic analyzer which comprises two columns 10 and 11 which are connected in series. A sample fluid to be analyzed is introduced through a conduit 12 which communicates with the first port 13*a* of a sample valve 13. Carrier fluid is introduced into the system through a conduit 14. A portion of this carrier fluid passes through a conduit 17 to a port 13*c*. A conduit 18 extends between a port 13*d* and the inlet of column 10. A conduit 19 extends between the outlet of column 10 and the inlet of column 11. Effluent from column 11 is directed through a conduit 20 to the first port of a detector 21. A portion of the incoming carrier gas is directed to the second port of detector 21 through a conduit 22. A sample loop 23 extends between ports 13*b* and 13*e* of valve 13. A vent conduit 24 communicates with a port 13*f*.

A valve 25 is positioned in sample inlet conduit 12 and is controlled by a solenoid 25*a*. A three-way valve 26 is disposed in conduit 17, and is controlled by a solenoid 26*a*. A vent conduit 27 communicates with valve 26. Sample valve 13 is controlled by a solenoid 13*g* through suitable actuating means, not shown. In the absence of solenoid 13*g* being energized, the valve is in the position illustrated so that the ports are connected as shown by the solid lines. When solenoid 13*g* is energized, the ports are connected as illustrated by the broken lines. Valve 13 can be a conventional rotary or diaphragm operated sample valve of a type well known in the art. A conduit 29 extends between conduit 14 and a three-way valve 30 which is controlled by solenoid 30*a*. A conduit 31, which has a valve 33 therein, extends between valve 30 and conduit 19. In similar fashion, a conduit 34, which has a valve 35 therein, extends between valve 30 and conduit 19.

At the start of an analysis cycle, valve 25 is open so that sample flows through loop 23 and is vented through conduit 24. Valve 13 is in a position so that carrier fluid passes through conduits 17 and 18, column 10, conduit 19, column 11, and conduit 20 to detector 21. Valve 30 is in a position so that carrier fluid passes through conduit 31 into conduit 19. Valve 33 is adjusted at this time so that the flow through conduit 31 is at a relatively low rate. The carrier fluid introduced into conduit 19 from conduit 31 flows through column 11. When an analysis is to be performed, solenoid 25*a* is energized to close valve 25. Solenoid 13*g* is then energized to actuate valve 13 so that the ports are connected as illustrated by the broken lines. Carrier fluid from conduit 17 thus flows through sample loop 23 to force a previously trapped volume of sample into column 10. Solenoid 13*g* is then deenergized to return valve 13 to the initial position. After the constituents of interest have passed through column 10, solenoids 26*a* are energized to divert carrier fluid into conduit 27 and to pass carrier fluid through conduit 34 instead of conduit 31. The position of valve 35 is such that a substantial greater flow of carrier fluid is thus introduced into conduit 19. A portion of this carrier fluid passes through column 11 to complete the analysis, and the remainder flows back through column 10 to backflush this column.

Detector 21 establishes an output signal which is representative of changes in composition of fluid flowing through conduit 20 in comparison with the carrier fluid flowing into conduit 22. This output signal is transmitted through an attenuation network 37 to a recorder 38. This attenuation network can comprise a series of potentiometers. Relay coils 39, 40 and 41 are associated with network 37 to vary the attenuation of the transmitted signal in accordance with the particular coil being energized. This permits signals of different amplitudes to be recorded using maximum scale of the recorder. The relay coils can selectively close switches to connect respective potentiometers into the network. Detector 21 is also provided with an automatic zero circuit 15 which is actuated when a relay coil 42 is energized. This circuit can adjust the balance of a bridge network associated with the detector. The coils illustrated in FIG. 1 are actuated in timed sequence by the programmer shown in FIG. 2.

Figure 2:
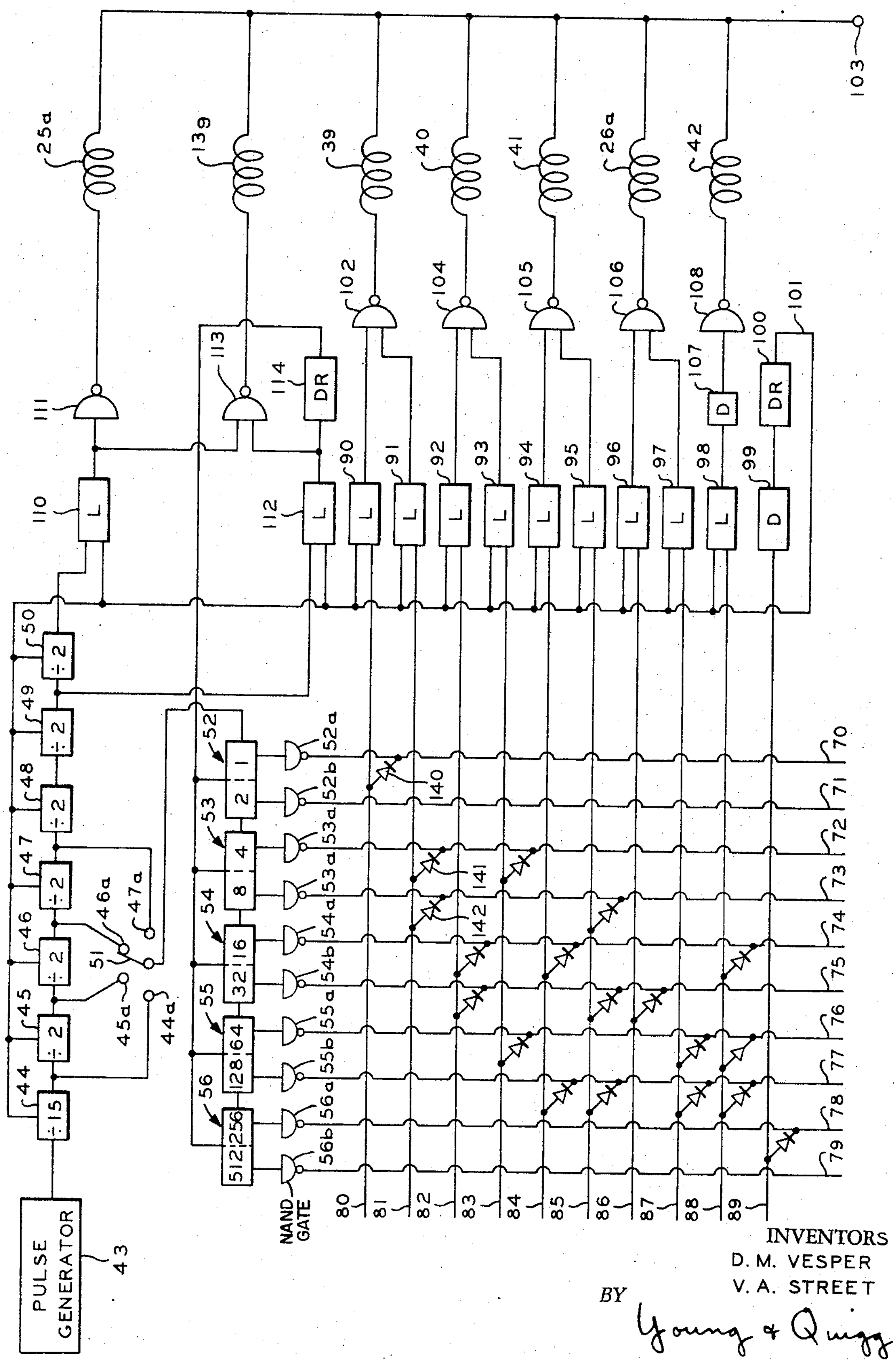
FIG. 2 is a schematic circuit drawing of an embodiment of the programmer.

As illustrated in FIG. 2, a pulse generator 43 establishes an output signal at a preselected frequency, such as 60 cycles per second, for example. This signal is transmitted through a first divider 44 which divides the input pulses by a factor of 15 and through additional dividers 45, 46, 47, 48, 49 and 50, each of which divides the input pulses thereto by a factor of two. These dividers can comprise a series of binary counters. With respect to divider 44, the last two outputs can be connected to reduce the normal division by 16 to a division by 15. The outputs of dividers 44, 45, 46 and 47 are connected to respective terminals 44*a*, 45*a*, 46*a* and 47*a* which are adapted to be engaged selectively by a switch 51. This permits pulses to be obtained at a plurality of given frequencies. If the frequency of pulse generator 43 is 60 cycles per second, pulses of four cycles per second are established at terminal 44*a*. Similarly, pulses of two cycles per second, one cycle per second, and one cycle per two seconds are established in respective terminals 45*a*, 46*a* and 47*a*. Switch 51 is connected to the input of a binary counter which comprises flip-flop circuits 52, 53, 54, 55 and 56 which are connected in series relationship.

Each of the flip-flop circuits is provided with two output terminals. The two output terminals of flip-flop 52 are connected to the inputs of respective NAND gates 52*a* and 52*b*, respectively. The two outputs of the remainder of the flip-flops are connected to the inputs of corresponding NAND gates. The outputs of the ten illustrated NAND gates are connected to respective leads 70 to 79.

The circuit of FIG. 2 is provided with ten additional leads 80 to 89 which are positioned adjacent leads 70 to 79 which are not connected thereto. Leads 80 to 88 are connected to first input terminals of respective latching circuits 90 to 98. Lead 89 is connected to the first terminal of a delay circuit 99. The output of delay circuit 99 is connected to a drive network 100, the output of which establishes a reset signal. This reset signal is transmitted over a lead 101 which is connected to the second input terminals of circuits 90 to 99 and to pulse dividers 44 to 50. The outputs of latches 90 and 91 are connected to the input terminals of a NAND circuit 102, the output of which is connected to the first terminal of coil 39. The second terminal of coil 39 is connected to a potential terminal 103. In a corresponding manner, the outputs of latches 92 and 93 are connected to a NAND circuit 104, latches 94 and 95 are connected to a NAND circuit 105, and latches 96 and 97 are connected to a NAND circuit 106. The outputs of circuits 104, 105 and 106 are connected to terminal 103 through respective coils 40, 41 and 26*a*. The output of latch 98 is connected through a delay network 107 and a driver 108 to coil 42.

Lead 101 and the output of divider 50 are connected to the respective input terminals of a latching circuit 110, the output of which is connected to the input of a driver 111. The output of driver 111 is connected to terminal 103 through solenoid 25*a*. Lead 101 and the output of divider 49 are connected to the respective input terminals of a latching circuit 112. The outputs of latches 110 and 112 are connected to the respective input terminals of a NAND circuit 113. The output of circuit 113 is connected to terminal 103 through solenoid 13*g*. The output of latch 112 is also connected through a driver circuit 114 to the reset terminals of flip-flops 52 to 56.

As previously mentioned, leads 70 to 79 normally are not connected to leads 80 to 89. This prevents signals from being applied to latching circuits 90 to 98 and to driver 99. In order to actuate the latter circuits, diodes are selectively connected between the leads. For example, if a diode 140 is connected between leads 80 and 70, a pulse is applied to latching circuit 90 when a pulse appears at the output of NAND gate 52*a*. If switch 51 is set to apply pulses to flip-flop 52 at a frequency of one per second, an actuating pulse is applied to latch 90 after one second. By placing a diode 141 between leads 81 and 72 and a diode 142 between leads 81 and 73, a deactuating pulse is applied to latch 91 after 12 seconds. The selective placing of diodes across the lead matrix thus permits the latching circuits to be actuated and de-actuated in a variety of timed sequences. The leads 70 to 79 and 80 to 89 can be wired to a pin board so that the diodes can be connected across the leads by selectively inserting pins which have the diode connected thereto. The timing sequence can readily be adjusted in this manner.

Figure 3:
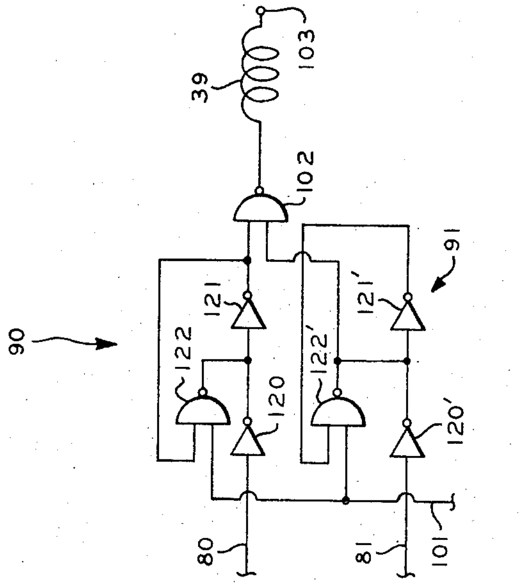
FIG. 3 is a schematic circuit drawing of a latching and control circuit associated with the programmer of FIG. 2.

The circuit elements associated with relay coil 39 are illustrated in FIG. 3. Lead 80 is connected to the input of an inverter 120. The output of inverter 120 is connected by a second inverter 121 to the first input of NAND inverting gate 102. The output of inverter 121 is also connected to the first input of a second NAND gate 122. Reset lead 101 is connected to the second input of gate 122. The output of gate 122 is connected to the input of inverter 121. Corresponding circuit elements, designated by like primed reference numerals, are connected to lead 81. The output of gate 122′ is connected to the second input of gate 102 instead of the output of inverter 121′.

In the illustrated embodiment, lead 80 goes "high" at the end of 1 second. The output of inverter 120 goes "low", and the output of inverter 121 goes "high". At this time, lead 101 is "high" and lead 81 is "low". The two inputs to gate 102 are "high", so that the output is "low". Current flows through relay coil 39 at this time. After 12 seconds, lead 81 goes "high". This causes the output of inverter 121′ to go "high", which results in the output of gate 122′ going "low". This "low" signal causes the output of gate 102 to go "high", to thereby deenergize relay coil 39. NAND gates 122 and 122′ serve to latch the circuit once it has been actuated. This prevents subsequent pulses from the flip 52 to 56 of FIG. 2 from changing the circuit until it has been reset by a pulse from driver 100. The gate circuits associated with relay coils 40, 41, and 26*a* operate in a corresponding manner.

Figure 4:
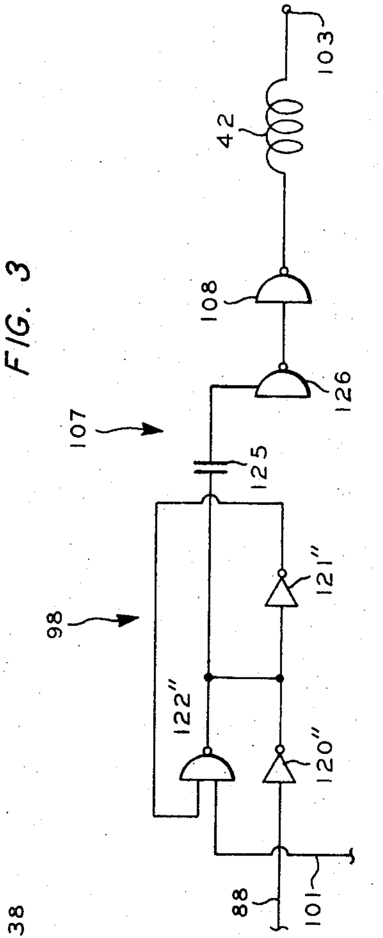
FIG. 4 is a second embodiment of a latching circuit.

The latching circuit 98 associated with relay coil 42 corresponds to latching circuit 90, and like elements are designated by double primed reference numerals in FIG. 4. When lead 88 goes "high", the output of inverter 120″ goes "low". This serves to charge a capacitor 125 from a power source, not shown, connected to NAND gate 126. The output of gate 126 is connected to the input of NAND gate 108. The size of capacitor 125 is selected so that the output signal from gate 126 will be of sufficient duration to permit the automatic zero circuit to complete its operation. This time can be of the order of 300 milliseconds, for example.

Figure 5:
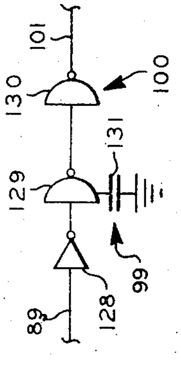
FIG. 5 is a schematic circuit drawing of the reset circuit employed in the programmer of FIG. 2.

The reset circuit is illustrated in FIG. 5. Lead 89 is connected by an inverter 128 to a NAND gate 129. The output of gate 129 is connected to the input of a NAND gate 130, the output of which is connected to reset lead 101. A capacitor 131 is connected between ground and gate 129. This capacitor provides a delay to insure that all of the latches and the flip-flops in the binary counters are reset. When lead 89 goes "high", capacitor 131 is discharged. The output of gate 129 goes "high", which causes the output of gate 130 to go "low". This is the reset signal. Capacitor 131 retains this reset signal for a short time interval after lead 89 goes "low".

In normal operation the programmer cycle begins with a reset signal being established at lead 101. This resets all of the counters 44 through 50 and by action of driver 114 which resets and inhibits counters 52 through 56. The sample flow is discontinued at this time by solenoid 25*a* and valve 25, trapping a volume of sample in loop 23. If pulse generator 43 has an output frequency of 60 Hertz, the output of divider 49 will change state after 8 seconds. This is transmitted through latch 112 to energize solenoid 13*g* thereby switching the sample valve so that the sample originally trapped in loop 23 is forced by the carrier gas through columns 10 and 11. At the same time, driver 114 enables counters 52 to 56, thereby starting a counting cycle at the start of the sample injection. Eight seconds later the output from divider 50 changes state. This, transmitted through latch 110, deenergizes solenoids 13*g* and 25*a* so that valve 25 is again opened and the sample valve is returned to its initial position.

The locations of the diodes on the matrix illustrated in FIG. 2 determine the times at which the attenuating relay coils 39, 40 and 41 are energized. The matrix diodes also control the time at which solenoid 26*a* is energized to backflush column 10. Relay coil 42 is usually energized at the end of the analysis cycle in preparation for a second analysis. In order to calibrate the analyzer initially, a sample of known composition is analyzed to determine the relative heights of the individual peaks. The attenuation network and the timing of the attenuation relay coils can then be adjusted to provide proper attenuation of the output signal from the detector during subsequent analyses.

While this invention has been described in conjunction with a presently preferred embodiment, it should be evident that it is not limited thereto.

What is claimed is:

1. A programmer comprising:

counting means having an input and a plurality of outputs, said counting means being adapted to receive a plurality of input signals at a first frequency and to establish a plurality of output signals in response thereto at progressively later times after the first of the input signals is received;

a plurality of output means;

a plurality of control means, each having a first input to actuate the control means, a second input to deactuate the control means, and an output, each of said control means comprising a first latching means connected to the first input of said control means to establish an output signal after an input signal is received at said first input, a second latching means connected to the second input of said control means to establish an output signal after an input signal is received at said second input, and a driving means connected to the two latching means to provide an output actuating signal when an output signal is established by the first latching means and to provide a deactuating output signal when an output signal is established by the second latching means;

means connecting the outputs of said control means to respective ones of said output means; and means to connect the outputs of said counting means selectively to the inputs of said control means so that said control means can be actuated and deactuated at selected times.

2. The programmer of claim 1, further comprising reset means having an input and an output, the output of said reset means being connected to each of said latching means, and means to connect the input of said reset means selectively to the outputs of said counting means.

3. The programmer of claim 2 wherein said reset means includes a delay means to delay the application of reset signals to said latching means after an input signal is applied to said reset means.

4. The programmer of claim 1, further comprising an additional output means, and an additional control means having an input and an output, means to connect the outputs of said counting means selectively to the input of said additional control means, and means to connect the output of said additional control means to said additional output means, said additional control means having a delay therein to permit said additional output means to be actuated for a predetermined time interval after an input signal is applied to said additional control means.

5. The programmer of claim 1 wherein said means to connect comprise a plurality of diodes.

6. The programmer of claim 1 wherein each of said control means comprises first and second inverters, the inputs of which are adapted to receive input signals; a third inverter having its input connected to the output of said first inverter; a fourth inverter having its input connected to the output of said second inverter; first, second and third NAND gates, each having first and second inputs; means connecting the outputs of said third inverter and said second inverter to the respective inputs of said first gate; means connecting the output of said third inverter to the first input of said second gate; means connecting the output of said second gate to the input of said third inverter; means connecting the output of said fourth inverter to the first input of said third gate; and means connecting the output of said third gate to the input of said fourth inverter; the second inputs of said second and third gates being adapted to receive a reset signal.

7. The programmer of claim 6, further comprising reset means having an input and an output, means to connect the input of said reset means selectively to the outputs of said counting means, and means connecting the output of said reset means to the second inputs of said second and third gates.

* * * * *